(12) United States Patent
Ueda

(10) Patent No.: US 12,157,236 B2
(45) Date of Patent: Dec. 3, 2024

(54) CONTROL METHOD FOR ROBOT SYSTEM, ROBOT SYSTEM, AND STORAGE MEDIUM

(71) Applicant: Seiko Epson Corporation, Tokyo (JP)

(72) Inventor: Junya Ueda, Azumino (JP)

(73) Assignee: SEIKO EPSON CORPORATION (JP)

( * ) Notice: Subject to any disclaimer, the term of this patent is extended or adjusted under 35 U.S.C. 154(b) by 420 days.

(21) Appl. No.: 17/704,071

(22) Filed: Mar. 25, 2022

(65) Prior Publication Data

US 2022/0305660 A1 Sep. 29, 2022

(30) Foreign Application Priority Data

Mar. 26, 2021 (JP) ................................. 2021-052920

(51) Int. Cl.
| | |
|---|---|
| *B25J 9/18* | (2006.01) |
| *B25J 9/16* | (2006.01) |
| *B25J 13/08* | (2006.01) |
| *G05B 19/19* | (2006.01) |

(52) U.S. Cl.
CPC ........... *B25J 9/1687* (2013.01); *B25J 13/085* (2013.01); *B25J 13/088* (2013.01)

(58) Field of Classification Search
CPC ....... B25J 9/1687; B25J 13/085; B25J 13/088
USPC .................................................. 318/568.11
See application file for complete search history.

(56) References Cited

U.S. PATENT DOCUMENTS

| | | | |
|---|---|---|---|
| 2018/0021950 A1* | 1/2018 | Shimodaira | B25J 13/02 318/568.11 |
| 2019/0329403 A1* | 10/2019 | Ueda | B25J 15/0052 |
| 2023/0286145 A1* | 9/2023 | Liu | B25J 9/1687 |

FOREIGN PATENT DOCUMENTS

| | | |
|---|---|---|
| JP | 2012-125852 A | 7/2012 |
| JP | 2014-043322 A | 3/2014 |
| JP | 2021-035706 A | 3/2021 |

* cited by examiner

*Primary Examiner* — Erick D Glass
(74) *Attorney, Agent, or Firm* — Harness, Dickey & Pierce, P.L.C.

(57) ABSTRACT

A control method for a robot system includes a detection step of detecting a position of a female connector, a reference position setting step of setting a reference position as a reference for determination as to whether or not an insertion of a male connector into the female connector is successful based on the position of the female connector, and an insertion operation step of moving the male connector in an insertion start position along an insertion direction of the female connector, with a position where a force sensor of a robot detects a predetermined force generated by contact between the male connector and the female connector during the movement as a comparison position, and determining whether or not the insertion is successful by comparing the reference position and the comparison position.

8 Claims, 8 Drawing Sheets

CONTROL METHOD FOR ROBOT SYSTEM, ROBOT SYSTEM, AND STORAGE MEDIUM

The present application is based on, and claims priority from JP Application Serial Number 2021-052920, filed Mar. 26, 2021, the disclosure of which is hereby incorporated by reference herein in its entirety.

BACKGROUND

1. Technical Field

The present disclosure relates to a control method for a robot system, a robot system, and a storage medium.

2. Related Art

For example, JP-A-2012-125852 discloses a control method for a robot system that inserts a workpiece into an insertion hole using a robot. In the control method, a difference in position of the workpiece with respect to the insertion hole is detected based on a movement amount of the workpiece from a motion start position and a force applied thereto, and determines whether or not the insertion of the workpiece into the insertion hole is successful based on the detection result. Further, for example, JP-A-2014-043322 discloses a method of detecting the position of the insertion hole based on an image captured by a camera and inserting the workpiece.

However, in the method of detecting the position of the insertion hole based on the image captured by the camera as disclosed in JP-A-2014-043322, when a false detection occurs, the set position of the insertion hole may be different from the real position. The workpiece is inserted into the insertion hole displaced from the real position, and thereby, even when the robot system determines that the workpiece is properly inserted into the insertion hole by driving on an instruction, in reality, improper insertion may occur and whether or not the insertion is successful may be erroneously determined.

JP-A-2012-125852 does not disclose a method of detecting the position of the insertion hole, however, when the position of the insertion hole is detected based on an image captured by a camera as is the case with JP-A-2014-043322, the same problem as that described above occurs.

SUMMARY

A control method for a robot system according to an aspect of the present disclosure is a control method for a robot system of gripping a male connector by a gripping unit of a robot and inserting the male connector into an insertion hole of a female connector, including a detection step of detecting a position of the female connector, a reference position setting step of setting a reference position as a reference for determination as to whether or not an insertion of the male connector into the female connector is successful based on the detected position of the female connector, and an insertion operation step of moving the male connector in an insertion start position along an insertion direction of the female connector, with a position where a force sensor of the robot detects a predetermined force generated by contact between the male connector and the female connector during the movement as a comparison position, and determining whether or not the insertion is successful by comparing the reference position and the comparison position.

A robot system according to an aspect of the present disclosure is a robot system inserting a male connector into an insertion hole of a female connector, including a robot in which a gripping unit gripping the male connector is provided, and a robot control apparatus controlling the robot, wherein the robot control apparatus detects a position of the female connector, sets a reference position as a reference for determination as to whether or not an insertion of the male connector into the female connector is successful based on the detected position of the female connector, moves the male connector in an insertion start position along an insertion direction of the female connector using the robot, with a position where a force sensor of the robot detects a predetermined force generated by contact between the male connector and the female connector during the movement as a comparison position, and determines whether or not the insertion is successful by comparing the reference position and the comparison position.

A non-transitory computer-readable storage medium according to an aspect of the present disclosure stores a program for commanding a robot system having a robot including a gripping unit and a force sensor, and a robot control apparatus controlling the robot to grip a male connector by the gripping unit and insert the male connector into an insertion hole of a female connector, and the program controls the robot system to perform a detection step of detecting a position of the female connector, a reference position setting step of setting a reference position as a reference for determination as to whether or not an insertion of the male connector into the female connector is successful based on the detected position of the female connector, and an insertion operation step of moving the male connector in an insertion start position along an insertion direction of the female connector, with a position where the force sensor of the robot detects a predetermined force generated by contact between the male connector and the female connector during the movement as a comparison position, and determining whether or not the insertion is successful by comparing the reference position and the comparison position.

DESCRIPTION OF EXEMPLARY EMBODIMENTS

As below, a control method for a robot system, a robot system, and a program according to the present disclosure will be explained in detail based on preferred embodiments shown in the accompanying drawings.

Figure 1:
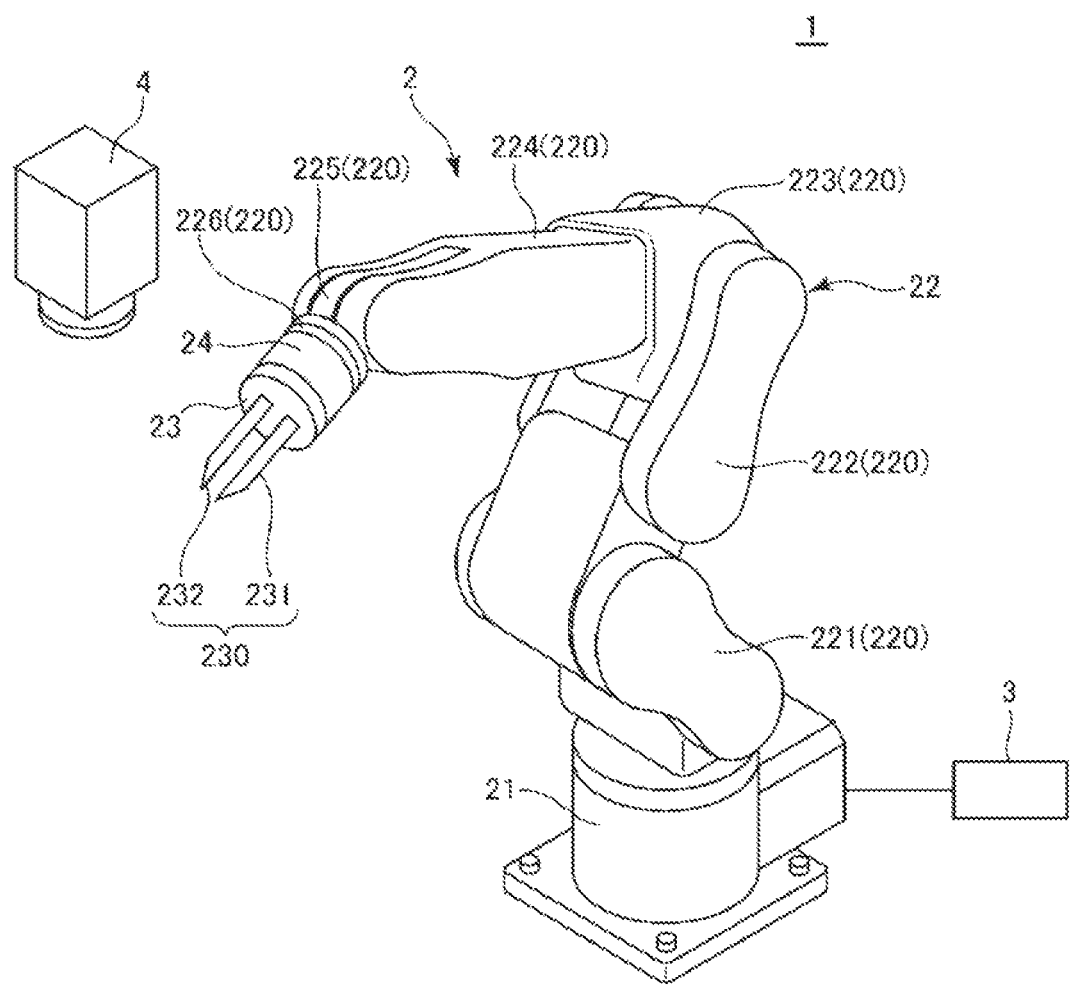
FIG. 1 is an overall configuration diagram of a robot system according to a preferred embodiment.
Figure 2:
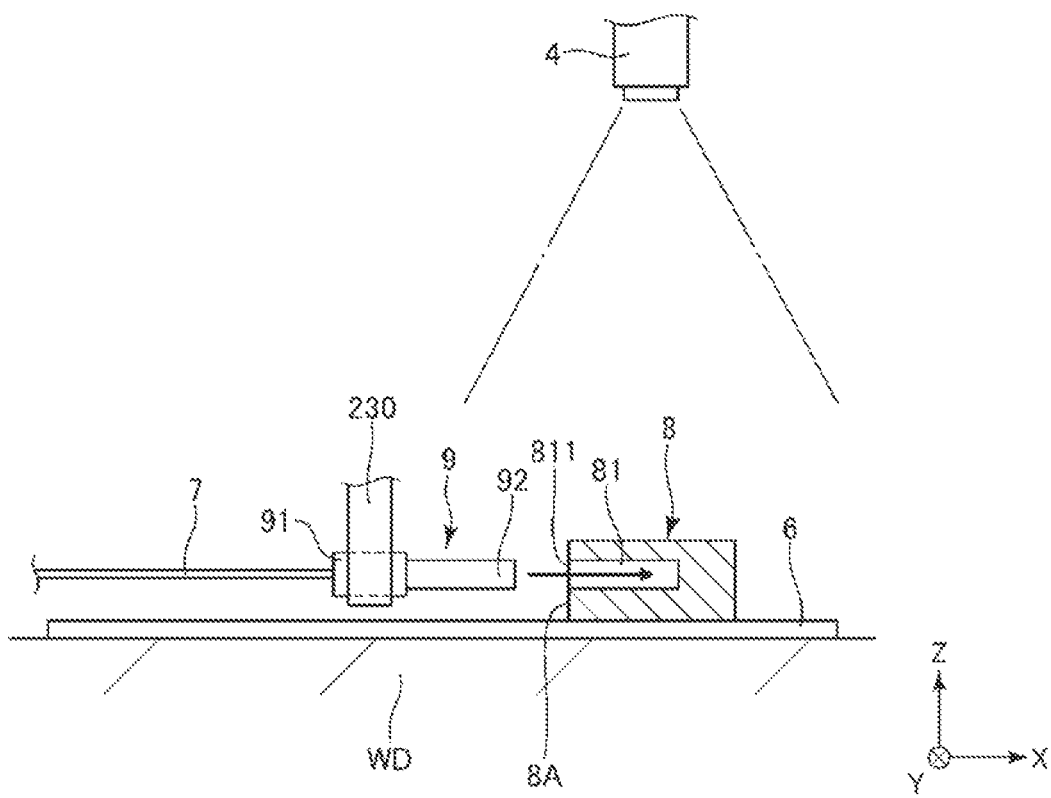
FIG. 2 is a sectional view showing insertion work performed by the robot system.
Figure 3:
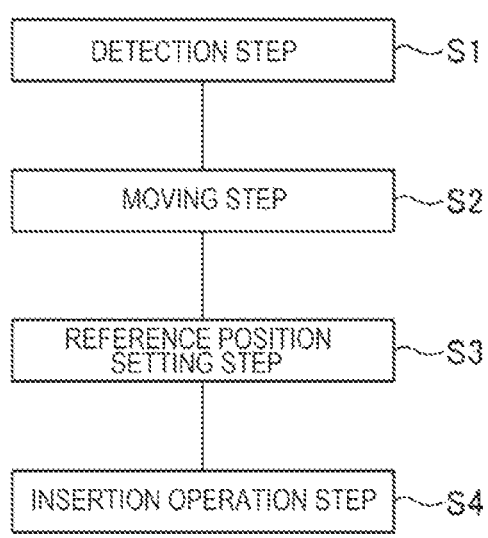
FIG. 3 is a flowchart showing steps of the insertion work.
Figure 4:
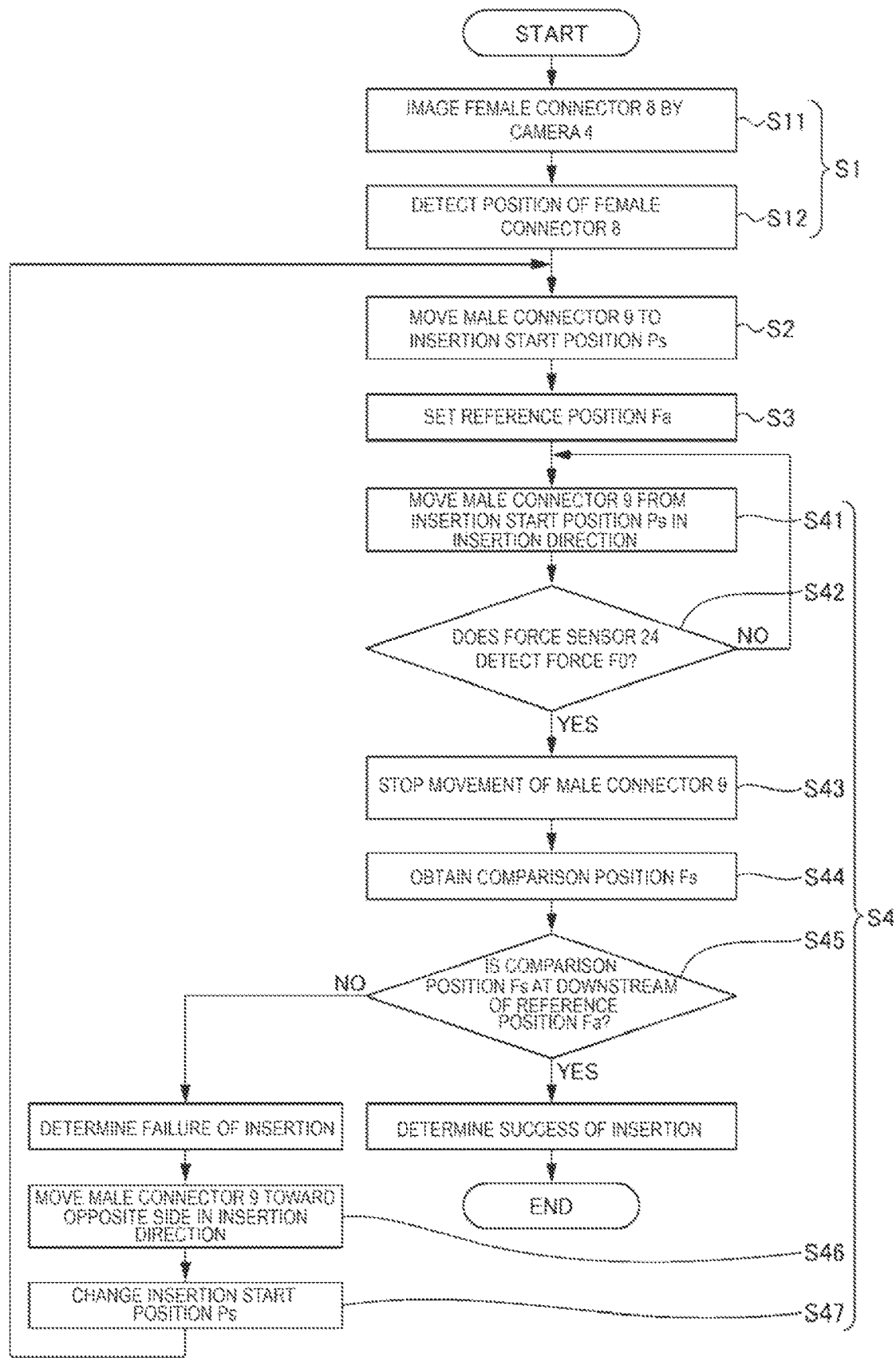
FIG. 4 is a flowchart showing steps of the insertion work.

FIG. 1 is an overall configuration diagram of a robot system according to a preferred embodiment. FIG. 2 is a sectional view showing insertion work performed by the robot system. FIGS. 3 and 4 are respectively flowcharts showing steps of the insertion work. FIGS. 5 to 12 are respectively sectional views showing each step of the insertion work.

Hereinafter, three axes orthogonal to one another are an X-axis, a Y-axis, and a Z-axis. Directions along the X-axis directions are also referred to as "X-axis directions", directions along the Y-axis directions are also referred to as "Y-axis directions", and directions along the Z-axis directions are also referred to as "Z-axis directions". Further, the arrow-head sides of the respective axes are also referred to as "plus sides", and the opposite sides are also referred to as "minus sides". Furthermore, the plus side in the Z-axis direction is also referred to as "upper" and the minus side is also referred to as "lower".

A robot system 1 shown in FIG. 1 includes a robot 2, a robot control apparatus 3 controlling the robot 2, and a camera 4 as a position detection device. As shown in FIG. 2, the robot system 1 may perform insertion work to insert a male connector 9 into a female connector 8 and mechanically and electrically couple these connectors.

First, prior to the explanation of the robot system 1, the female connector 8 and the male connector 9 are explained.

Female Connector 8

As shown in FIG. 2, the female connector 8 is mounted on an upper surface of a circuit board 6. The female connector 8 has an insertion hole 81 into which the male connector 9 is to be inserted, and a terminal (not shown) connecting to the circuit board 6 is provided within the insertion hole 81. Further, the insertion hole 81 extends in the X-axis directions and opens in a side surface 8A at the minus side in the X-axis direction. Accordingly, the male connector 9 is positioned at the minus side in the X-axis direction with respect to the female connector 8, further, the male connector 9 is moved toward the plus side in the X-axis direction, and thereby, the male connector 9 may be inserted into the insertion hole 81 of the female connector 8.

The female connector 8 of the embodiment is a NON-ZIF (Zero Insertion Force) connector. The NON-ZIF connector is also called "non-ZIF connector" or "one-action connector" and requires an insertion force when the male connector 9 is inserted into the insertion hole 81. Note that the female connector 8 is not limited to the NON-ZIF connector, but may be e.g. a ZIF connector.

Male Connector 9

As shown in FIG. 2, the male connector 9 has a base portion 91 and an insertion portion 92 projecting from the base portion 91 and inserted into the insertion hole 81 of the female connector 8. A terminal (not shown) is provided in the insertion portion 92 and, when the insertion portion 92 is properly inserted into the insertion hole 81, the terminals of each other are electrically coupled. Further, a cable 7 is coupled to the male connector 9. As the cable 7, any cable e.g. an FPC (Flexible Printed Circuits), an FFC (Flexible Flat Cable), an optical cable, a LAN cable, a USB cable, or a coaxial cable may be used.

As above, the female connector 8 and the male connector 9 are explained. Next, the respective parts of the robot 1 will be explained.

Robot 2

As shown in FIG. 1, the robot 2 is a single-arm six-axis vertical articulated robot in the embodiment. Note that the robot 2 is not particularly limited, but may be e.g. a dual-arm articulated robot, a scalar robot (horizontal articulated robot), or the like. Further, the robot 2 may be a stationary robot fixed to a floor or the like or a self-advancing automated guided robot. The robot 2 has a base 21, a robot arm 22, an end effector 23 attached to the distal end of the robot arm 22, and a force sensor 24 placed between the robot arm 22 and the end effector 23.

The base 21 is a supporter drivably supporting the robot arm 22 from the downside and fixed to e.g. a floor within a factory or a platform within a factory. The robot arm 22 has a plurality of arms 220 pivotably coupled to each other. The robot arm 22 has a first arm 221, a second arm 222, a third arm 223, a fourth arm 224, a fifth arm 225, and a sixth arm 226 as the plurality of arms 220, and these arms 221 to 226 are sequentially coupled from the base 21 side. Further, the adjacent arms are coupled via joints and the arms located at the distal end side are pivotable relative to the arms located at the proximal end side. The number of the arms 220 is not limited to six.

The end effector 23 is attached to the sixth arm 226 via the force sensor 24. Further, the end effector 23 has a gripping unit 230 gripping the male connector 9. The gripping unit 230 has a pair of claw portions 231, 232 nipping the male connector 9. Note that the gripping unit 230 is not particularly limited as long as the unit may grip the male connector 9, but may have e.g. a configuration gripping the male connector 9 by air chuck or the like.

The force sensor 24 is placed between the sixth arm 226 and the end effector 23. The force sensor 24 may detect a force applied to the male connector 9 gripped by the end effector 23.

Camera 4

The camera 4 is placed above the robot 2 and, as shown in FIG. 2, images the female connector 8 from above. The robot control apparatus 3 detects the position of the female connector 8 based on the image containing the female connector 8 acquired by the camera 4. The camera 4 is not particularly limited, but a 2D camera, a 3D camera, or the like may be used. Note that, as will be described later, in the embodiment, the insertion work is performed with the female connector 8 mounted on a workbench WD. Accordingly, the Z-axis coordinate of the female connector 8 may be obtained from the height of the workbench WD and set in advance. Therefore, it is only necessary to detect coordinates (X,Y,U) of the female connector 8, and the 2D camera is sufficient. The U refers to a coordinate around the Z-axis. On the other hand, when the Z-axis coordinate of the female connector 8 is unknown, the respective coordinates (X, Y, Z, U) may be detected using the 3D camera.

In the embodiment, the camera 4 is placed apart from the robot 2 and the position thereof is fixed relative to the workbench WD, however, not limited to that. For example, the camera 4 may be fixed to the robot arm 22 or the end effector 23 of the robot 2. In this case, the robot arm 22 may be moved to position the female connector 8 within the angle of view of the camera 4 and imaging by the camera 4 may be performed in the condition. Further, the position detection device is not limited to the camera 4 as long as the device may detect the position of the female connector 8, but e.g. a profilometer using laser may be used.

Robot Control Apparatus 3

As shown in FIG. 1, the robot control apparatus 3 is coupled to the robot 2. The robot control apparatus 3 includes e.g. a computer having a processor (CPU) processing information, a memory communicably coupled to the processor, and an external interface. A program P that can be executed by the processor is stored in the memory, and the processor reads and executes the program P stored in the memory. The robot control apparatus 3 controls the robot 2 to perform insertion work based on the program P.

The program P is a program for commanding execution of the insertion work to the robot system 1. As shown in FIG. 3, the program P controls the robot system 1 to perform a detection step S1 of detecting the position of the female connector 8, a moving step S2 of moving the male connector 9 to an insertion start position Ps, a reference position setting step S3 of setting a reference position Fa based on the position of the female connector 8, and an insertion operation step S4 of moving the male connector 9 in an insertion direction of the female connector 8, with a position where the force sensor 24 detects a force F0 as a comparison position Fs during the movement, determining whether or not the insertion is successful by comparing the reference position Fa and the comparison position Fs. The respective steps will be explained in detail as a control method for the robot system 1, which will be described later.

As above, the overall configuration of the robot system 1 is explained. Next, the control method for the robot system 1 by the robot control apparatus 3 will be explained. Note that the explanation of the control method for the robot system 1 is used as the explanation of the program P.

The control method for the robot system 1 by the robot control apparatus 3 is a method of gripping the male connector 9 by the robot 2 and inserting the gripped male connector 9 into the insertion hole 81 of the female connector 8. The control method is executed by the program P. Accordingly, like the program P, as shown in FIG. 3, the method includes the detection step S1 of detecting the position of the female connector 8, the moving step S2 of moving the male connector 9 to the insertion start position Ps, the reference position setting step S3 of setting a reference position Fa based on the position of the female connector 8, and the insertion operation step S4 of moving the male connector 9 in the insertion direction of the female connector 8, with the position where the force sensor 24 detects the force F0 during the movement as a comparison position Fs, determining whether or not the insertion is successful by comparing the reference position Fa and the comparison position Fs. As below, the respective steps S1 to S4 will be sequentially explained based on the flowchart shown in FIG. 4.

[1] Detection Step S1

Figure 5:
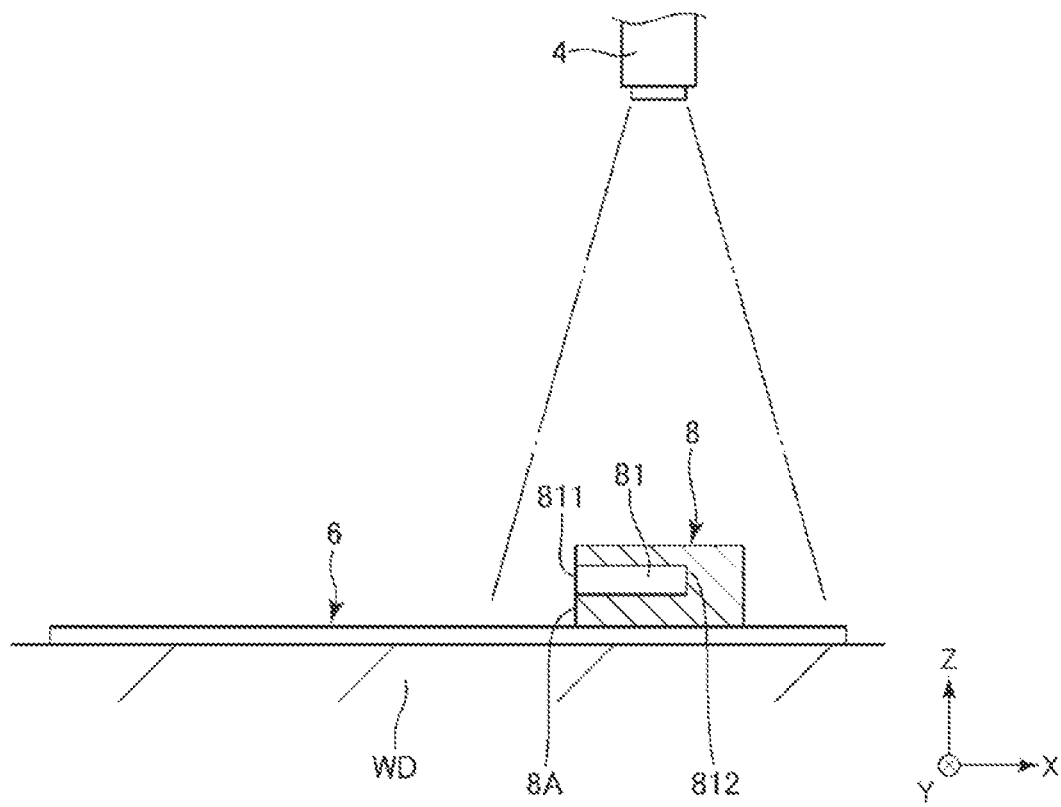
FIG. 5 is a sectional view showing each step of the insertion work.

First, as shown in FIG. 5, as step S11, the female connector 8 mounted on the workbench WD is imaged by the camera 4, and the captured image is output to the robot control apparatus 3. Note that the mounting of the female connector 8 on the workbench WD may be performed by the robot system 1 itself or another robot system. Alternatively, the connector may be transported by a transporter such as a belt conveyer. Then, as step S12, the robot control apparatus 3 detects a position and an attitude of the female connector 8 based on the image from the camera 4. The position within the image from the camera 4 is related to the coordinates (X, Y, Z, U) by the robot control apparatus 3. Therefore, the coordinates (X, Y, Z, U) of the female connector 8 may be specified based on the position of the female connector 8 within the image. Note that the Z-axis coordinate is known as described above and preset based on the height of the workbench WD. Further, the attitude (orientation) of the female connector 8 may be detected by template matching of the contour shape of the female connector 8 within the image to the 3D shape data of the female connector 8 acquired in advance. The method of detecting the position and the attitude is not particularly limited.

[2] Moving Step S2

Figure 6:
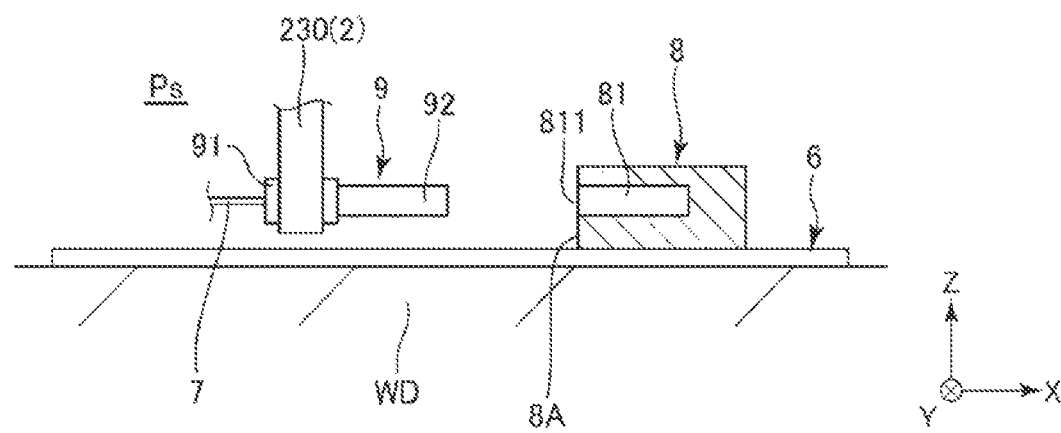
FIG. 6 is a sectional view showing each step of the insertion work.

Then, as shown in FIG. 6, the robot 2 grips the male connector 9 by the gripping unit 230 and moves the male connector 9 to the insertion start position Ps. The insertion start position Ps is determined based on the coordinates (X, Y, Z, U) of the female connector 8 detected at the detection step S1 so that the insertion portion 92 of the male connector 9 and the insertion hole 81 of the female connector 8 may face in correct position and these may be arranged in the X-axis directions.

[3] Reference Position Setting Step S3

Figure 7:
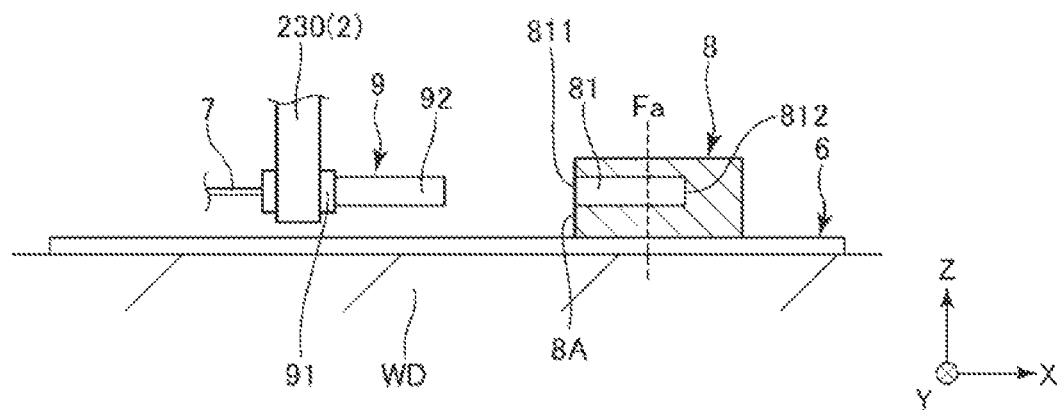
FIG. 7 is a sectional view showing each step of the insertion work.

Then, as shown in FIG. 7, the robot control apparatus 3 sets the reference position Fa based on the position of the female connector 8 detected at the detection step S1. The reference position Fa is a position as a reference for determination as to whether or not the insertion work is successful. The reference position Fa is a YZ-plane orthogonal to the X-axis direction as the insertion direction, and set to overlap with the insertion hole 81. It is preferable to set the reference position to avoid both end portions in the X-axis directions of the insertion hole 81 in consideration of a position detection error that may be produced at the detection step S1. Thereby, even when the position of the female connector 8 detected at the detection step S1 is different from the real position, the determination as to whether or not the insertion work is successful at the insertion operation step S4 may be performed with higher accuracy.

The reference position Fa is set between an opening 811 as an end at the minus side in the X-axis direction of the insertion hole 81 and an abutment 812 as an end at the plus side in the X-axis direction (a surface restricting the further movement of the male connector 9 toward the plus side in the X-axis direction). For example, for the program P, a reference position setting rule for setting the reference position Fa in a position at M (mm) from the opening 811 toward the plus side in the X-axis direction or setting the reference position Fa in a position at N (mm) from the distal end of the male connector 9 in the insertion start position Ps toward the plus side in the X-axis direction is predetermined, and the robot control apparatus 3 sets the reference position Fa according to the rule. The M, N are appropriately changed depending on the shape and the size of the female connector 8.

[4] Insertion Operation Step S4

Figure 8:
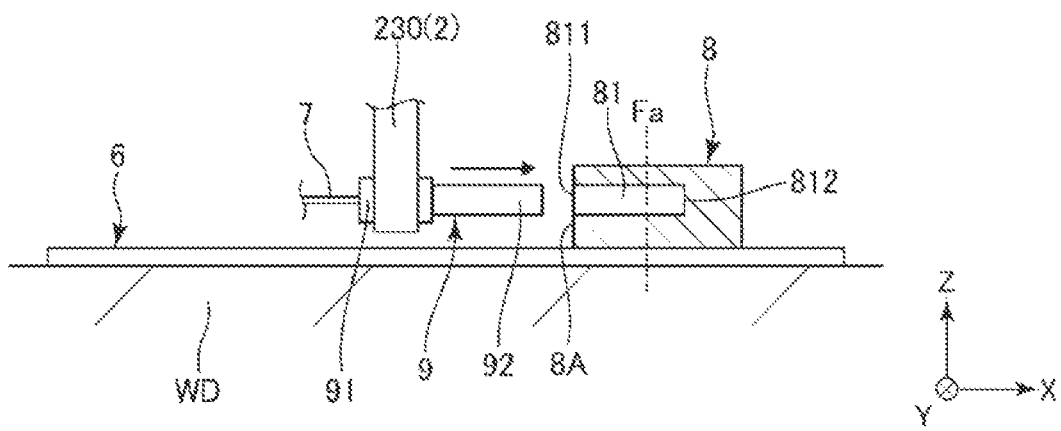
FIG. 8 is a sectional view showing each step of the insertion work.

Then, as shown in FIG. 8, as step S41, the robot 2 starts the insertion work to insert the male connector 9 into the female connector 8. Specifically, the robot 2 moves the robot arm 22 to move the male connector 9 in the insertion direction of the female connector 8, that is, toward the plus side in the X-axis direction.

Figure 9:
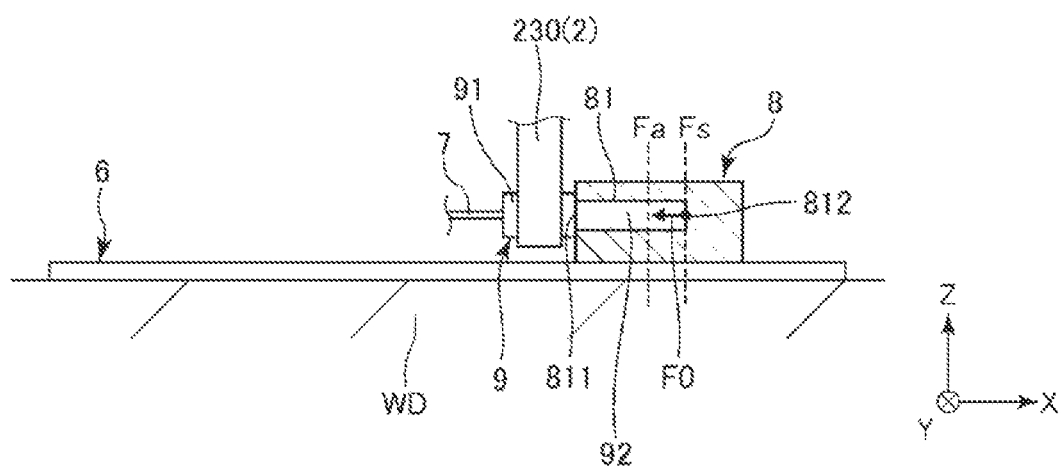
FIG. 9 is a sectional view showing each step of the insertion work.
Figure 10:
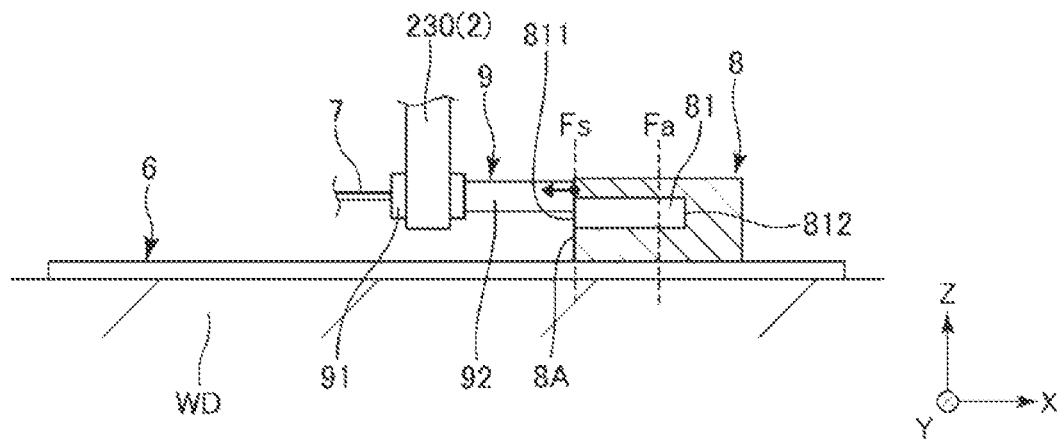
FIG. 10 is a sectional view showing each step of the insertion work.

Next, as step S42, the robot control apparatus 3 determines whether or not the force sensor 24 detects the force F0 during step S41. When a force actually generated by the contact between the female connector 8 and the male connector 9 is F1, the force F1 corresponds to e.g. a force generated by the male connector 9 appropriately inserted into contact with the abutment 812 as shown in FIG. 9 or a force generated by the male connector 9 unsuccessfully inserted into contact with the side surface 8A of the female connector 8 as shown in FIG. 10. The robot control apparatus 3 determines whether or not the force F1 reaches the force F0.

When a target force of the insertion operation is F2, it is preferable to set the force F0 as a value smaller than the target force F2. That is, it is preferable to set the force F0 to satisfy F1≤F0<F2. Thereby, whether or not the insertion is successful may be determined with higher accuracy.

When the force sensor 24 detects the force F0, as steps S43, S44, the robot 2 promptly stops the movement of the male connector 9. Further, the robot control apparatus 3 obtains the position of the distal end portion of the male connector 9 when the force sensor 24 detects the force F0 as the comparison position Fs. In this manner, at step S43, the movement of the male connector 9 is stopped, and thereby, an excessive force is harder to be applied to the female connector 8 and the male connector 9, and detachment of the male connector 9 from the gripping unit 230 and breakage and failure of the female connector 8 and the male connector 9 may be effectively suppressed.

Then, as step S45, the robot control apparatus 3 compares the comparison position Fs and the reference position Fa, and determines whether or not the insertion of the male connector 9 into the female connector 8 is successful. Specifically, when the comparison position Fs is located at the downstream in the insertion direction, i.e., at the plus side in the X-axis direction with respect to the reference position Fa, in other words, when the force F0 is detected after the reference position Fa, the robot control apparatus 3 determines that the insertion work is successful. In this case, as shown in FIG. 9, the male connector 9 is appropriately inserted into the insertion hole 81, the distal end thereof contacts the abutment 812, and the insertion is completed. When a success is determined, the robot control apparatus 3 ends the insertion work.

On the other hand, when the comparison position Fs is located at the upstream in the insertion direction, i.e., at the minus side in the X-axis direction with respect to the reference position Fa, in other words, when the force F0 is detected before the reference position Fa, the robot control apparatus 3 determines that the insertion work is failed. In this case, as shown in FIG. 10, the male connector 9 shifts in the Z-axis direction or the Y-axis direction with respect to the insertion hole 81 and the insertion portion 92 contacts the side surface 8A of the female connector 8, and the insertion into the female connector 8 is unsuccessful.

Figure 11:
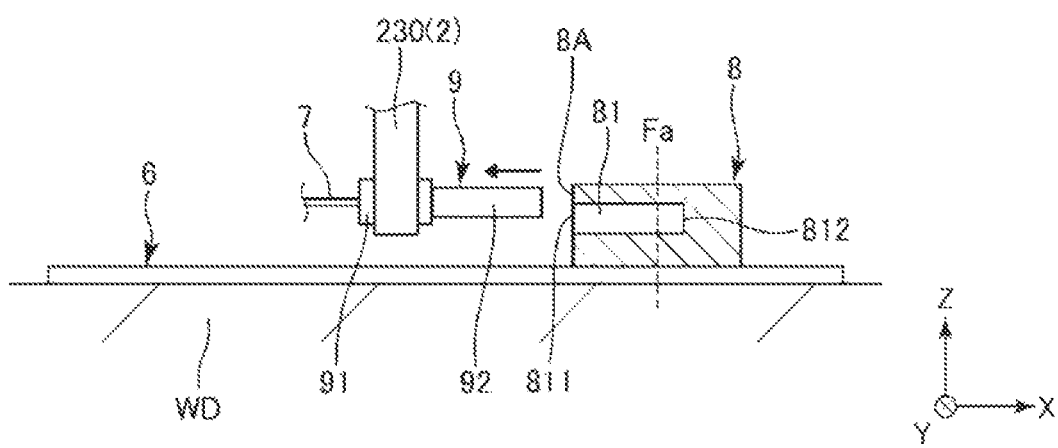
FIG. 11 is a sectional view showing each step of the insertion work.
Figure 12:
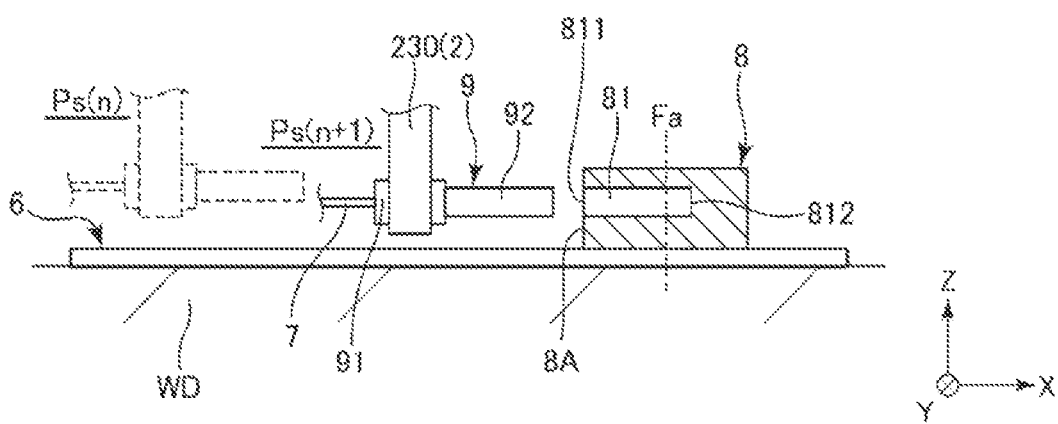
FIG. 12 is a sectional view showing each step of the insertion work.

When a failure is determined, as shown in FIG. 11, as step S46, the robot 2 moves the robot arm 22 to move the male connector 9 to the opposite side to the insertion direction, i.e., to the minus side in the X-axis direction. Thereby, the contact between the male connector 9 and the female connector 8 is released. Then, as shown in FIG. 12, as step S47, the insertion start position Ps is changed from the last position and the process is performed again from the moving step S2 until a success is determined at step S45. Note that, in FIG. 12, the last insertion start position Ps is shown by Ps(n) and the present insertion start position Ps is shown by Ps(n+1). It is only necessary that the insertion start position Ps(n+1) shifts at least in one direction of the Y-axis direction and the Z-axis direction with respect to the insertion start position Ps(n). As the manner to shift the insertion start position Ps, for example, the position may be spirally shifted in a plan view in the X-axis direction or linearly shifted in the Z-axis direction or the Y-axis direction.

As above, the control method for the robot system 1 is explained. According to the control method, whether or not the insertion of the male connector 9 into the female connector 8 is successful is determined based on the comparison between the comparison position Fs and the reference position Fa, and thereby, even when the coordinates (X, Y, Z, U) of the female connector 8 detected at the detection step S1 are different from the real coordinates (X, Y, Z, U) of the female connector 8, a probability of erroneous determination as to whether or not the insertion is successful may be reduced compared to the method in related art.

As described above, the control method for the robot system 1 is the control method for the robot system 1 of gripping the male connector 9 by the gripping unit 230 of the robot 2 and inserting the male connector 9 into the insertion hole 81 of the female connector 8, including the detection step S1 of detecting the position of the female connector 8, the reference position setting step S3 of setting the reference position Fa as the reference for determination as to whether or not the insertion of the male connector 9 into the female connector 8 is successful based on the detected position of the female connector 8, and the insertion operation step S4 of moving the male connector 9 in the insertion start position Ps along the X-axis direction as the insertion direction of the female connector 8, with the position where the force sensor 24 of the robot 2 detects the predetermined force F0 generated by contact between the male connector 9 and the female connector 8 during the movement as the comparison position Fs, and determining whether or not the insertion is successful by comparing the reference position Fa and the comparison position Fs. According to the control method, whether or not the insertion of the male connector 9 into the female connector 8 is successful is determined based on the comparison between the comparison position Fs and the reference position Fa, and thereby, even when the coordinates (X, Y, Z, U) of the female connector 8 detected at the detection step S1 are different from the real coordinates (X, Y, Z, U) of the female connector 8, a probability of erroneous determination as to whether or not the insertion is successful may be reduced compared to the method in related art.

As described above, at the insertion operation step S4, when the comparison position Fs is located at the downstream in the insertion direction with respect to the reference position Fa, a success of the insertion of the male connector 9 into the female connector 8 is determined. According to the determination method, whether or not the insertion is successful may be determined with higher accuracy.

As described above, when the success is determined, the insertion operation step S4 is ended. Thereby, the insertion work may be promptly ended.

As described above, at the insertion operation step S4, when the comparison position Fs is located at the upstream in the insertion direction with respect to the reference position Fa, a failure of the insertion of the male connector 9 into the female connector 8 is determined. According to the determination method, whether or not the insertion is successful may be determined with higher accuracy.

As described above, when the failure is determined, the insertion start position Ps is changed and the insertion operation step S4 is performed again. Thereby, the insertion of the male connector 9 into the female connector 8 may be made successful.

As described above, at the insertion operation step S4, when the force sensor detects the predetermined force F0, the movement of the male connector 9 stops. Thereby, an excessive force is harder to be applied to the female connector 8 and the male connector 9, and detachment of the male connector 9 from the gripping unit 230 and breakage and failure of the female connector 8 and the male connector 9 may be effectively suppressed.

As described above, the robot system 1 is the robot system inserting the male connector 9 into the insertion hole 81 of the female connector 8, including the robot 2 in which the gripping unit 230 gripping the male connector 9 is provided and the robot control apparatus 3 controlling the robot 2, and the robot control apparatus 3 detects the position of the female connector 8, sets the reference position Fa as the reference for determination as to whether or not the insertion of the male connector 9 into the female connector 8 is successful based on the detected position of the female connector 8, moves the male connector 9 in the insertion start position Ps along the insertion direction of the female connector 8 using the robot 2, with the position where the force sensor 24 of the robot 2 detects the predetermined force F0 generated by contact between the male connector 9 and the female connector 8 during the movement as the comparison position Fs, and determines whether or not the insertion is successful by comparing the reference position Fa and the comparison position Fs. According to the robot system 1, whether or not the insertion of the male connector 9 into the female connector 8 is successful is determined based on the comparison between the comparison position Fs and the reference position Fa, and thereby, even when the coordinates (X, Y, Z, U) of the female connector 8 detected at the detection step S1 are different from the real coordinates (X, Y, Z, U) of the female connector 8, a probability of erroneous determination as to whether or not the insertion is successful may be reduced compared to the method in related art.

As described above, the program P is a program for commanding the robot system 1 having the robot 2 including the gripping unit 230 and the force sensor 24 and the robot control apparatus 3 controlling the robot 2 to grip the male connector 9 by the gripping unit 230 and insert the male connector 9 into the insertion hole 81 of the female connector 8, and the program controls the robot system 1 to perform the detection step S1 of detecting the position of the female connector 8, the reference position setting step S3 of setting the reference position Fa as the reference for determination as to whether or not the insertion of the male connector 9 into the female connector 8 is successful based on the detected position of the female connector 8, and the insertion operation step S4 of moving the male connector 9 in the insertion start position Ps along the insertion direction of the female connector 8, with the position where the force sensor 24 of the robot 2 detects the predetermined force F0 generated by contact between the male connector 9 and the female connector 8 during the movement as the comparison position Fs, and determining whether or not the insertion is successful by comparing the reference position Fa and the comparison position Fs. According to the program P, whether or not the insertion of the male connector 9 into the female connector 8 is successful is determined based on the comparison between the comparison position Fs and the reference position Fa, and thereby, even when the coordinates (X, Y, Z, U) of the female connector 8 detected at the detection step S1 are different from the real coordinates (X, Y, Z, U) of the female connector 8, a probability of erroneous determination as to whether or not the insertion is successful may be reduced compared to the method in related art.

As above, the control method for the robot system, the robot system, and the program according to the present disclosure are explained based on the illustrated embodiments, however, the present disclosure is not limited to those. The respective parts forming the robot system may be replaced by any configurations that may fulfill the same functions. Further, any configuration may be added thereto. Furthermore, the order of the respective steps in the control method for the robot system may be appropriately changed as long as the insertion work may be executed. For example, the order may be changed to exchange the moving step S2 and the reference position setting step S3.

Figure 13:
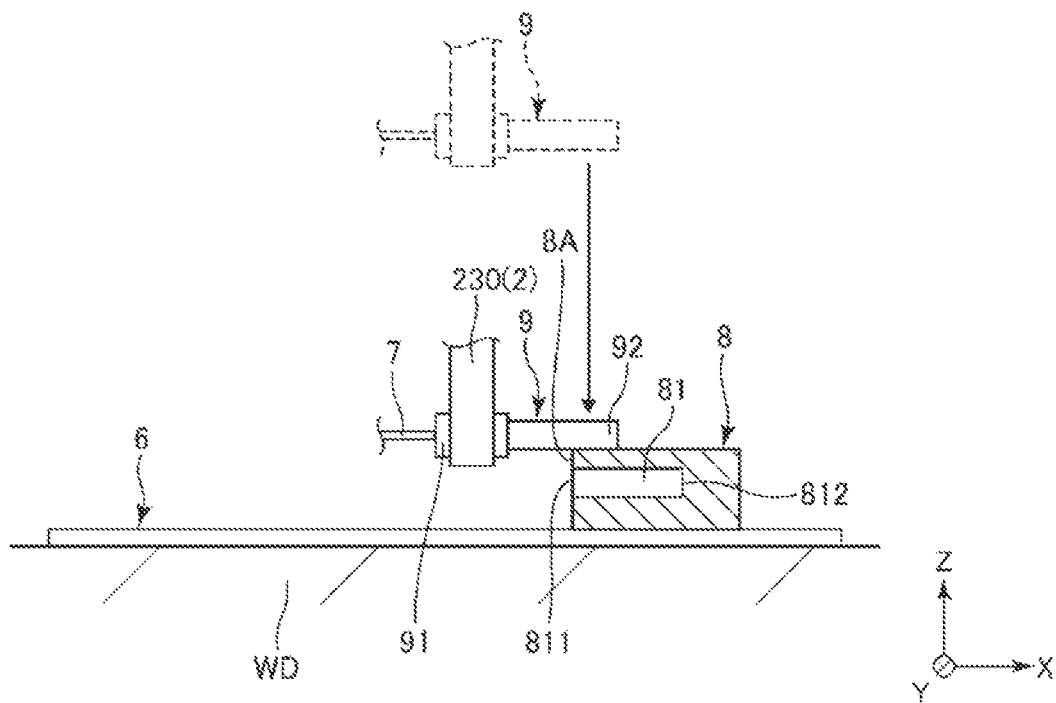
FIG. 13 is a sectional view showing a modified example of a detection step.

For example, in the above described embodiments, the position of the female connector 8 is detected using the camera 4 as the position detection device, however, the method of detecting the position of the female connector 8 is not limited to that. For example, the position may be detected without using the position detection device. For example, as shown in FIG. 13, the male connector 9 gripped by the gripping unit 230 is moved upward and downward in the Z-axis directions while the position within the XY-plane is shifted and the contact with the upper surface of the female connector 8 is detected by the force sensor 24, and thereby, the position of the female connector 8 may be detected. Further, the male connector 9 is further brought into contact with the female connector 8 from the Y-axis directions and the X-axis directions, and thereby, the position of the female connector 8 may be detected with higher accuracy.

Figure 14:
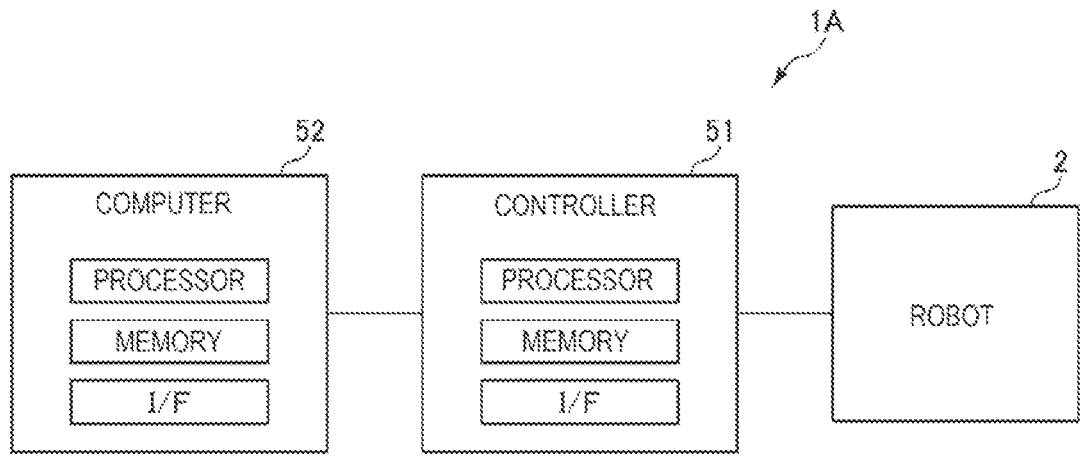
FIG. 14 is a block diagram showing a hardware configuration of the robot system.

As below, hardware configurations of the robot system will be explained. FIG. 14 shows an overall configuration of a robot system 1A in which the robot 2, a controller 51, and a computer 52 are coupled. The control of the robot 2 may be executed by reading out a command in a memory by a processor in the controller 51 or executed via the controller 51 by reading out a command in a memory by a processor in the computer 52. Therefore, one or both of the controller 51 and the computer 52 may be regarded as "robot control apparatus 3".

Figure 15:
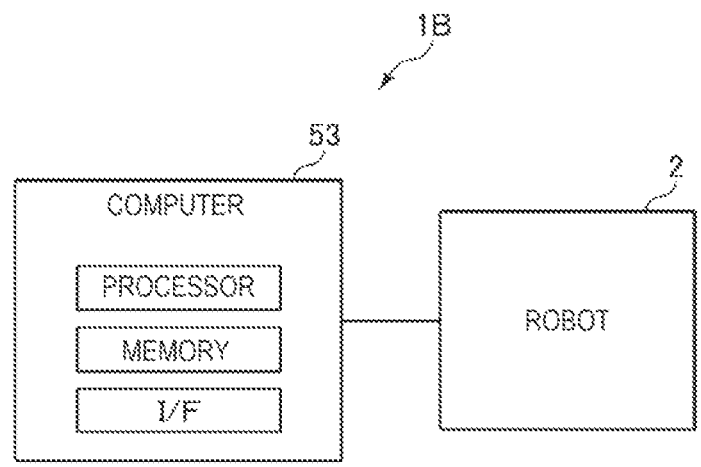
FIG. 15 is a block diagram showing a hardware configuration of the robot system.

Further, FIG. 15 shows an overall configuration of a robot system 1B in which a computer 53 is directly coupled to the robot 2. The control of the robot 2 is directly executed by reading out a command in a memory by a processor in the computer 53. Therefore, the computer 53 may be regarded as "robot control apparatus 3".

Figure 16:
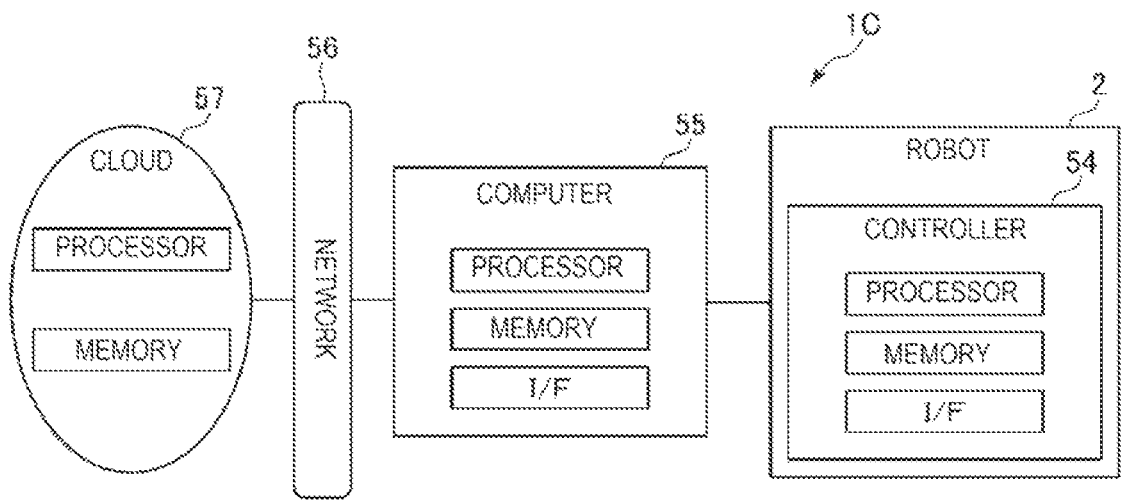
FIG. 16 is a block diagram showing a hardware configuration of the robot system.

Furthermore, FIG. 16 shows an overall configuration of a robot system 1C in which the robot 2 containing a controller 54 and a computer 55 are coupled and the computer 55 is coupled to a cloud 57 via a network 56 such as a LAN. The control of the robot 2 may be executed by reading out a command in a memory by a processor in the computer 55 or executed via the computer 55 by reading out a command in a memory by a processor in the cloud 57. Therefore, one, two, or three of the controller 54, the computer 55, and the cloud 57 may be regarded as "robot control apparatus 3".

What is claimed is:

1. A control method for a robot system of gripping a male connector by a gripping unit of a robot and inserting the male connector into an insertion hole of a female connector, comprising:
   a detection step of detecting a position of the female connector;
   a reference position setting step of setting a reference position as a reference for determination as to whether or not an insertion of the male connector into the female connector is successful based on the detected position of the female connector; and an insertion operation step of moving the male connector in an insertion start position along an insertion direction of the female connector, with a position where a force sensor of the robot detects a predetermined force generated by contact between the male connector and the female connector during the movement as a comparison position, and determining whether or not the insertion is successful by comparing the reference position and the comparison position.

2. The control method for a robot system according to claim 1, wherein at the insertion operation step, when the comparison position is located at a downstream in the insertion direction with respect to the reference position, a success of the insertion of the male connector into the female connector is determined.

3. The control method for a robot system according to claim 2, wherein when the success is determined, the insertion operation step is ended.

4. The control method for a robot system according to claim 1, wherein at the insertion operation step, when the comparison position is located at an upstream in the insertion direction with respect to the reference position, a failure of the insertion of the male connector into the female connector is determined.

5. The control method for a robot system according to claim 4, wherein when the failure is determined, the insertion start position is changed and the insertion operation step is performed again.

6. The control method for a robot system according to claim 1, wherein at the insertion operation step, when the force sensor detects the predetermined force, the movement of the male connector stops.

7. A robot system inserting a male connector into an insertion hole of a female connector, comprising:

a robot in which a gripping unit gripping the male connector is provided; and a robot control apparatus controlling the robot, wherein the robot control apparatus detects a position of the female connector, sets a reference position as a reference for determination as to whether or not an insertion of the male connector into the female connector is successful based on the detected position of the female connector, moves the male connector in an insertion start position along an insertion direction of the female connector using the robot, with a position where a force sensor of the robot detects a predetermined force generated by contact between the male connector and the female connector during the movement as a comparison position, and determines whether or not the insertion is successful by comparing the reference position and the comparison position.

8. A non-transitory computer-readable storage medium storing a program for commanding a robot system having a robot including a gripping unit and a force sensor, and a robot control apparatus controlling the robot to grip a male connector by the gripping unit and insert the male connector into an insertion hole of a female connector, the program controlling the robot system to perform a detection step of detecting a position of the female connector, a reference position setting step of setting a reference position as a reference for determination as to whether or not an insertion of the male connector into the female connector is successful based on the detected position of the female connector, and an insertion operation step of moving the male connector in an insertion start position along an insertion direction of the female connector, with a position where the force sensor of the robot detects a predetermined force generated by contact between the male connector and the female connector during the movement as a comparison position, and determining whether or not the insertion is successful by comparing the reference position and the comparison position.

* * * * *